R. BENNETT.
HOSE COUPLING.
APPLICATION FILED DEC. 22, 1914.

1,181,060.   Patented Apr. 25, 1916.
2 SHEETS—SHEET 1.

Witnesses
M. H. Slifer
J. W. Garner

Inventor
Robert Bennett
By Victor J. Evans
Attorney

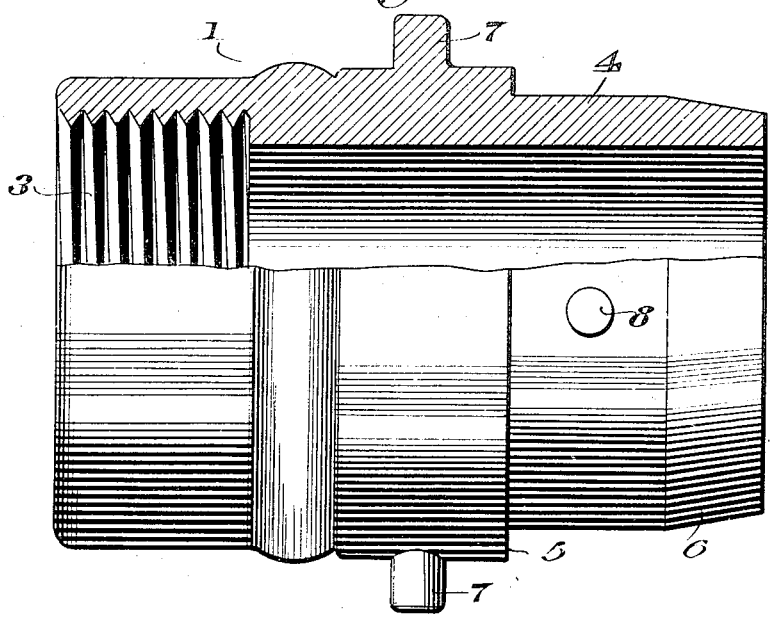
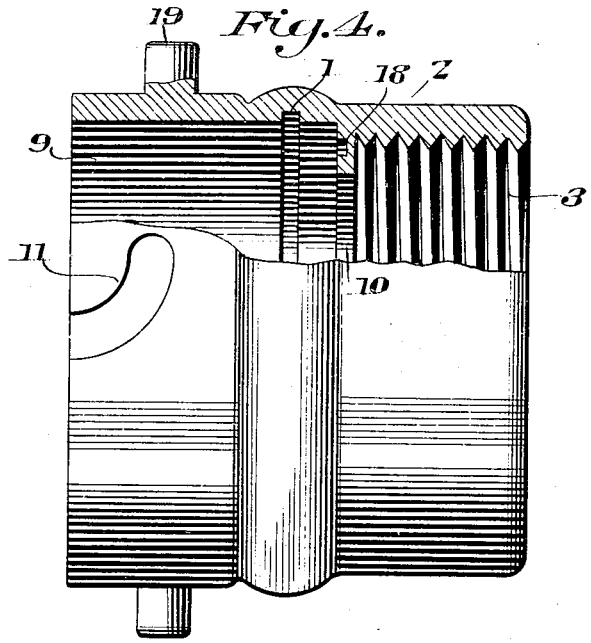

UNITED STATES PATENT OFFICE.

ROBERT BENNETT, OF BEACON, NEW YORK.

HOSE-COUPLING.

1,181,060.  Specification of Letters Patent.  Patented Apr. 25, 1916.

Application filed December 22, 1914. Serial No. 878,575.

*To all whom it may concern:*

Be it known that I, ROBERT BENNETT, a citizen of the United States, residing at Beacon, in the county of Dutchess and State of New York, have invented new and useful Improvements in Hose-Couplings, of which the following is a specification.

This invention is an improved hose coupling, especially adapted for use in coupling lengths of fire hose together, the object of the invention being to provide an improved hose coupling, which is cheap and simple in construction, which may be readily coupled and uncoupled, which is watertight and which is enabled to sustain extreme water pressure so that the lengths of hose will remain coupled even when the nozzle is shut off.

The invention consists in the construction, combination and arrangement of devices hereinafter described and claimed.

Figure 1:
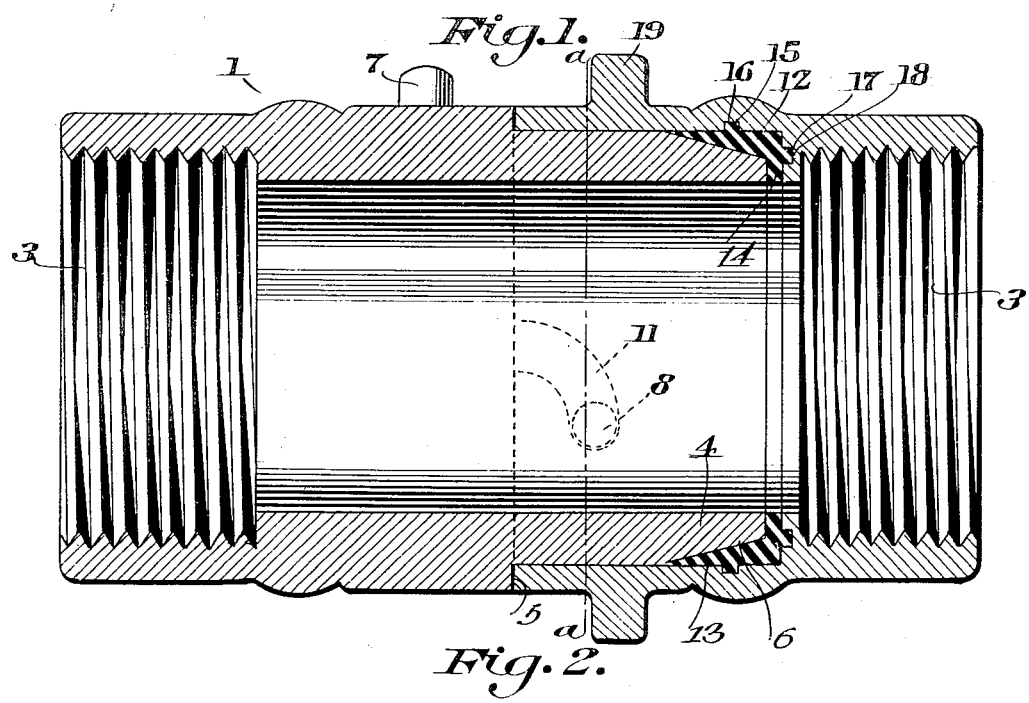
Figure 2:
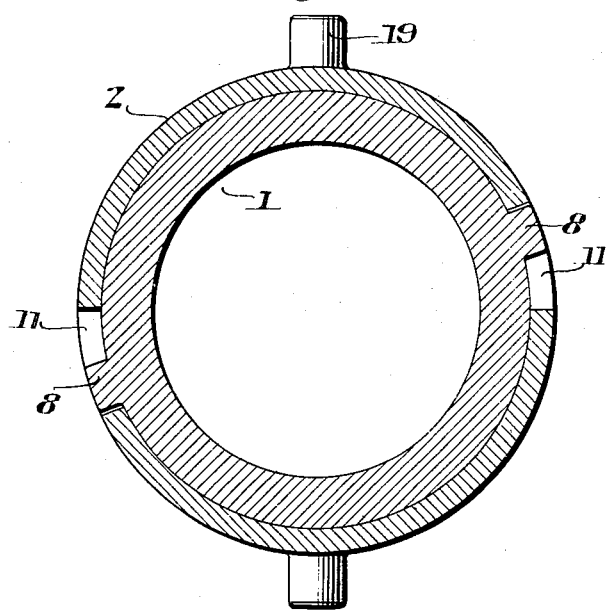

In the accompanying drawings:—Figure 1 is a longitudinal sectional view of a coupling constructed in accordance with my invention, showing the coupling members in coupled relation. Fig. 2 is a transverse sectional view of the same on the plane indicated by the line a—a of Fig. 1. Fig. 3 is partly an elevation and partly a longitudinal sectional view of one of the coupling members. Fig. 4 is a similar view of the other coupling member.

My improved hose coupling comprises a pair of tubular members 1—2 which correspond in exterior diameter. These members are threaded on their inner sides at their outer ends as at 3 to enable the hose sections to be fastened thereto by the usual means and in the usual manner. The member 1 has a diametrically reduced projecting annular portion 4, forming an annular shoulder 5 at its base, the said projecting portion being tapered or beveled on its outer side at its outer end as at 6. The said member 1 is provided with exteriorly arranged lugs 7 for engagement by a spanner wrench and its reduced and extended portion 4 is provided at diametrically opposite points with radial studs 8. The member 2 is counter-bored at its outer end at 9 to receive the projecting portion 4 of the member 1 and has an annular shoulder 10 at the inner end or base of said counter-bore. The said member 1 is also provided with curved slots 11, which are here shown as quadrant shaped and which are adapted to receive the studs 8 of the member 1 so that by inserting said studs in said slots and then partly turning one member the said studs coact with the slots to tightly and securely draw the members 1—2 together and hold them in coupled relation. To effect a watertight joint between the members 1—2 I also provide a gasket 12. This gasket is fitted in the base of the counterbore 5 of the member 2 and has a wall 13 which bears between the wall of said counterbore and the beveled or tapered portion 6 of the projection 4, the said wall 13 being beveled on its inner side to correspond with the bevel of said projection. The said gasket is also provided with a base wall 14 which is at right angles to its wall 13 and which bears between the end of the projection 4 and the shoulder 10. When the members 1—2 are coupled together the said gasket is compressed so that it effects a perfectly watertight joint between the said members as will be understood. The gasket is provided on the outer side of its wall 13 with a flange or bead 15 which fits in a corresponding groove 16 in the member 1 and also has a bead or flange 17 at its base which fits in a corresponding groove 18 in the shoulder 10. These grooves and flanges securely hold the gasket in place and prevent it from being detached from the member 2 when the members of the hose coupling are disconnected from each other. The member 2 also has lugs 19 for engagement by a spanner wrench the spanner wrench being used in connecting and disconnecting the coupling members.

Having thus described my invention, I claim:—

In a hose coupling, the combination of a member having a tapered projecting end and also provided with radial studs, and a second member having a counter bore to receive the tapered end of the first named member and also having a quadrant shaped locking slot to receive the studs of the first named member, and a gasket in the base of the counter bore of the second named member for engagement and compression by the tapered member of the first named member, the said gasket having an annular rib on its outer side and its base, and the second member having a plurality of grooves engaged by the respective rib on the outer side of the gasket and the rib on the base of the gasket, said rib and grooves co-acting with each other to prevent detachment of the gasket.

In testimony whereof I affix my signature in presence of two witnesses.

ROBERT BENNETT.

Witnesses:
 ANNA O'BRIEN,
 JAMES P. NEARY.